US006187889B1

(12) United States Patent
Oi et al.

(10) Patent No.: US 6,187,889 B1
(45) Date of Patent: Feb. 13, 2001

(54) COPOLYMER, PROCESS FOR PRODUCTION THEREOF, AND MOLDED ARTICLE THEREOF

(75) Inventors: Nobuo Oi, Narashino; Tatsuya Miyatake, Ichihara, both of (JP)

(73) Assignee: Sumitomo Chemical Company, Limited, Osaka (JP)

(*) Notice: Under 35 U.S.C. 154(b), the term of this patent shall be extended for 0 days.

(21) Appl. No.: 09/349,487

(22) Filed: Jul. 9, 1999

(30) Foreign Application Priority Data

Jul. 10, 1998 (JP) .................................................. 10-195621
Sep. 16, 1998 (JP) .................................................. 10-261762

(51) Int. Cl.[7] ............................. C08F 212/08; C08F 4/44
(52) U.S. Cl. ...................... 526/347; 526/347.1; 526/161; 526/943; 502/152
(58) Field of Search ................................ 526/347, 347.1, 526/943, 161; 502/152

(56) References Cited

U.S. PATENT DOCUMENTS 5,866,659 * 2/1999 Chung et al. ......................... 525/279

FOREIGN PATENT DOCUMENTS

| 0416815A2 | 3/1991 | (EP) . |
| 0842955A2 | 5/1998 | (EP) . |
| 60-26011 | 2/1985 | (JP) . |
| 4318006 | 11/1992 | (JP) . |
| 08269134 | 10/1996 | (JP) . |
| 8269134 | 10/1996 | (JP) . |
| WO9809999A2 | 3/1998 | (WO) . |

OTHER PUBLICATIONS

Wu, Qing et al. *Macromol. Chem. Phys.* vol. 199, pp. 1715–1720, (1998).

* cited by examiner

*Primary Examiner*—David W. Wu
*Assistant Examiner*—R. Harlan
(74) *Attorney, Agent, or Firm*—Birch, Stewart, Kolasch & Birch, LLP

(57) ABSTRACT

A copolymer of an α-olefin with an alkenyl aromatic hydrocarbon having a structure in which tertiary carbon atoms are mutually separated by two methylene groups in the skeleton of the copolymer, a process for producing said copolymer with a specific catalyst and a molded article of said copolymer, and the copolymer and molded article thereof are transparent, excellent in elastic recoverability, flexibility, mechanical strength and scratch resistance.

20 Claims, 4 Drawing Sheets

(A) Transition Metal Component $M^1$ : 4th Group transition Metal Atom ,
A:16th Group Atom , J:14th Group Atom
$Cp^1$:Group having Cyclopentadiene Anion Skeleton
$X^1, X^2, R^1, R^2, R^3, R^4, R^5, R^6$: Hydrogen, Halogen, Alkyl, Aralkyl, Aryl, Substituted Silyl, Alkoxy, 2-substituted Amino (B) Organometallic Component
Organoaluminum and/or Aluminoxane (C) Third Component
Boron Compound Copolymer of Alkenyl Aromatic Hydrocarbon and Alpha-olefin

COPOLYMER, PROCESS FOR PRODUCTION THEREOF, AND MOLDED ARTICLE THEREOF

BACKGROUND OF THE INVENTION

1. Field of the Invention

The present invention relates to a copolymer suitable for a stretch film and a wrap film in particular, a process for producing said copolymer, and a molded article of said copolymer.

2. Description of the Related Arts

In general, an elastic recoverability, transparency and mechanical strength found in a polyvinyl chloride are required for a copolymer to be used as a stretch film, a shrink film or a wrap film. However, the polyvinyl chloride comes in question concerning environmental pollution because of the possibility of generation of harmful substances in incineration. Various kind of polymers are presently considered as a replacement for the polyvinyl chloride, but it is a status quo that none of them being satisfactory from the viewpoints of viscoelastic properties and transparency has been obtained.

Since copolymerization of an α-olefin represented by propylene with an alkenyl aromatic hydrocarbon represented by styrene was carried out using a Solvay type titanium trichloride catalyst, studies using various solid catalysts have been carried out. For example, polymerization processes which use a solid catalyst using titanium tetrachloride and an electron donor are disclosed in Japanese Patent Publication (Kokai) Nos. 60-26011 and 4-318006. However, in both of those processes, the polymerization activity is low and a homopolymer is formed as a by-product. Further, the obtained copolymer has a low amount of copolymerized styrene and possesses some crystallinity, and is not adequate from the viewpoints of elastic recoverability, flexibility and transparency.

Japanese Patent Publication (Kokai) No. 8-269134 discloses a process for producing a copolymer of propylene with styrene which has syndiotactic propylene sequences using a so-called homogeneous Ziegler-Natta catalyst which uses a specific transition metal compound and an organoaluminum compound. However, the copolymer obtained by the process, has also a low styrene content and a crystallinity, and is insufficient from the viewpoints of elastic recoverability, flexibility and transparency.

SUMMARY OF THE INVENTION

An object of the present invention is to provide a novel copolymer of an α-olefin with an alkenyl aromatic hydrocarbon having a transparency and excellent elastic recoverability and flexibility, and not containing a halogen which may be pointed out as a cause for environmental pollution. Another object of the present invention is to provide a process for producing said copolymer at high polymerization activity, and a molded article of said copolymer which is excellent in mechanical strength, flexibility and anti-scratch property, and further has a transparency and good elastic recoverability.

In order to attain the above-mentioned objects, the present inventors have intensively studied about a copolymer of an α-olefin with an alkenyl aromatic hydrocarbon which is based on a production process using a transition metal compound represented by a metallocene as a catalyst component, and have completed the present invention.

The present invention relates to a copolymer of an α-olefin with an alkenyl aromatic hydrocarbon wherein the copolymer has a structure in which tertiary carbon atoms are mutually separated by two successive methylene groups in the backbone of the copolymer; a process for producing said copolymer which comprises copolymerizing an α-olefin with an alkenyl aromatic hydrocarbon in the presence of a catalyst using (A) and [(B) and/or (C)] described below; and a molded article of said copolymer.

(A): a transition metal complex represented by the following general formula [I]:

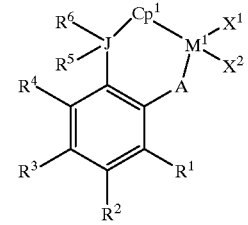

[I]

(wherein $M^1$ represents a transition metal atom of the Group IV of the Periodic Table of the Elements; A represents an atom of the Group XVI of the Periodic Table of the Elements; J represents an atom of the Group XIV of the Periodic Table of the Elements; $Cp^1$ represents a group having a cyclopentadiene type anion skeleton; $X^1$, $X^2$, $R^1$, $R^2$, $R^3$, $R^4$, $R^5$ and $R^6$ independently represent a hydrogen atom, a halogen atom, an alkyl group, an aralkyl group, an aryl group, a substituted silyl group, an alkoxy group, an aralkyloxy group, an aryloxy group or a di-substituted amino group; and $R^1$, $R^2$, $R^3$, $R^4$, $R^5$ and $R^6$ may be optionally combined with each other to form a ring);

(B): one or more aluminum compounds selected from the following (B1) to (B3);

(B1) an organoaluminum compound represented by the general formula $E^1{}_a AlZ_{3-a}$, (B2) a cyclic aluminoxane having a structure represented by the general formula $\{-Al(E^2)-O-\}_b$, and (B3) a linear aluminoxane having a structure represented by the general formula $E^3\{-Al(E^3)-O-\}_c AlE^3{}_2$ (wherein $E^1$, $E^2$ and $E^3$ respectively represent a hydrocarbon group, all of $E^1$, all of $E^2$ and all of $E^3$ may be the same or different; Z represents a hydrogen atom or a halogen atom, and all of Z may be the same or different; a represents a number satisfying the expression $0<a\leq3$; b represents an integer of 2 or more and c represents an integer of 1 or more); and (C): a boron compound of any one of the following (C1) to (C3);

(C1) a boron compound represented by the general formula $BQ^1Q^2Q^3$, (C2) a boron compound represented by the general formula $G^+(BQ^1Q^2Q^3Q^4)^-$, and (C3) a boron compound represented by the general formula $(L-H)^+(BQ^1Q^2Q^3Q^4)^-$ (wherein B represents a boron atom in the trivalent valence state; $Q^1$ to $Q^4$ may be the same or different and respectively represent a halogen atom, a hydrocarbon group, a halogenated hydrocarbon group, a substituted silyl group, an alkoxy group or a di-substituted amino group; $G^+$ represents an inorganic or organic cation; L represents a neutral Lewis base; and $(L-H)^+$ represents a Brønsted acid).

DETAILED DESCRIPTION OF THE INVENTION

Figure 1:
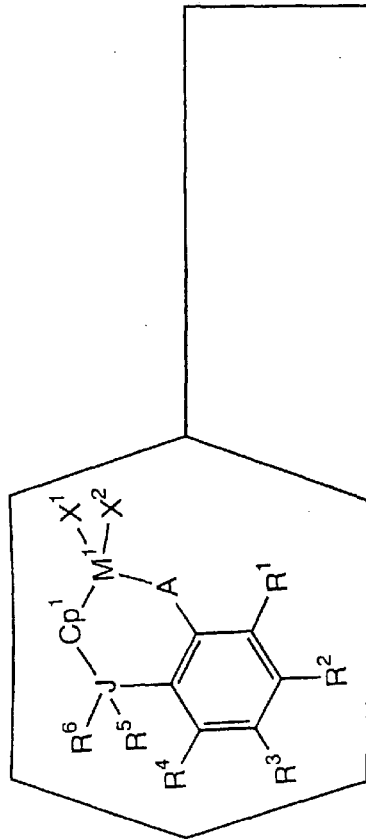
FIG. 1 is a flowchart drawing for help of the understanding of the present invention. The present flow chart drawing is a typical example of the mode of operation of the present invention, and the present invention is not restricted thereto.

The present invention is illustrated in detail below.

The copolymer of the present invention is a copolymer of an α-olefin with an alkenyl aromatic hydrocarbon wherein the copolymer has a structure in which tertiary carbon atoms are mutually separated by two successive methylene groups (in other words, an ethylene group) in the backbone of the copolymer.

As the α-olefin in the present invention, α-olefins having 3 to 20 carbon atoms are preferable, and specific examples of the α-olefin include linear olefins such as propylene, 1-butene, 1-pentene, 1-hexene, 1-heptene, 1-octene, 1-nonene, 1-decene and the like, branched olefins such as 3-methyl-1-butene, 3-methyl-1-pentene, 4-methyl-1-pentene, 5-methyl-1-hexene and the like, vinylcyclohexane and the like. More preferable α-olefin is propylene, 1-butene, 1-pentene, 1-hexene, 1-heptene, 1-octene, 4-methyl-1-pentene, or vinylcyclohexane, and in particular, propylene is preferable.

As an alkenyl aromatic hydrocarbon in the present invention, alkenyl compounds having an aromatic hydrocarbon group having 6 to 25 carbon atoms is preferable. Specific examples of the aromatic hydrocarbon group having 6 to 25 carbon atoms include a phenyl group, tolyl group, xylyl group, tert-butylphenyl group, vinylphenyl group, naphthyl group, phenanthryl group, anthrathenyl group and the like. A phenyl group, tolyl group, xylyl group, tert-butylphenyl group, vinylphenyl group or naphthyl group is preferable.

Specific examples of such an alkenyl aromatic hydrocarbon include alkylstyrenes such as p-methylstyrene, m-methylstyrene, o-methylstyrene, p-ethylstyrene, m-ethylstyrene, o-ethylstyrene, 2,4-dimethylstyrene, 2,5-dimethylstyrene, 3,4-dimethylstyrene, 3,5-dimethylstyrene, 3-methyl-5-ethylstyrene, p-tert-butylstyrene, p-sec-butylstyrene and the like; alkenylbenzenes such as styrene, 2-phenylpropylene, 2-phenylbutene and the like; bis(alkenyl)benzenes such as divinylbenzene and the like; vinylnaphthalenes such as 1-vinylnaphthalene and the like, etc. As the alkenyl aromatic hydrocarbon used in the present invention, styrene, p-methylstyrene, m-methylstyrene, o-methylstyrene, p-tert-butylstyrene, 2-phenylpropylene, divinylbenzene or 1-vinylnaphthalene is preferable and styrene is preferable in particular.

The copolymer of the present invention is a copolymer of an α-olefin with an alkenyl aromatic hydrocarbon, and its copolymerization composition is preferably 0.1 to 55% by mole as a content of the alkenyl aromatic hydrocarbon unit, more preferably 1 to 35% by mole and most preferably 6 to 30% by mole. The remainder is the α-olefin unit. When the copolymerization composition is within the range, the copolymer is preferably excellent in flexibility, in particular. The copolymerization composition is easily determined by a $^{13}$C-NMR spectrum using o-dichlorobenzene as a solvent.

The copolymer of the present invention has a structure in which tertiary carbon atoms are mutually separated by two successive methylene groups (herein-after, referred to simply as "two methylene groups") in the backbone. When the α-olefin or alkenyl aromatic hydrocarbon unit is bonded to an inverse direction in the molecular chains of the copolymer, namely, when the insertion form of the α-olefin or alkenyl aromatic hydrocarbon takes 2,1-insertion successively after 1,2-insertion, tertiary carbon atoms are mutually separated by two methylene groups. The structure of such a copolymer is easily determined by a $^{13}$C-NMR spectrum using o-dichlorobenzene as a solvent, and when tertiary carbon atoms are mutually separated by two methylene groups, signals corresponding to the methylene groups (Sαβ) are observed as a plural number of peaks at 30 to 38 ppm.

The copolymer having positions in which tertiary carbon atoms are mutually separated by two methylene groups in the backbone has a mitigated rigidity of the main chain and is excellent in elastic recoverability and flexibility.

The copolymer in the present invention may have a structure in which tertiary carbon atoms are mutually separated by one methylene group in the backbone and a structure in which tertiary carbon atoms are mutually separated by three or more methylene groups in the backbone.

For example, when a so-called head-to-tail bond by which two of the α-olefin or alkenyl aromatic hydrocarbon unit are sequentially bonded in a same direction occurres, tertiary carbon atoms are mutually separated by one methylene group (Sαα).

In the copolymer of the present invention, the molecular weight distribution (Mw/Mn) represented by a ratio of weight average molecular weight (Mw) to number average molecular weight (Mn) is preferably 1.5 to 4.0 from the viewpoints of mechanical strength and transparency.

The copolymer of the present invention is preferably an amorphous copolymer substantially having no crystallinity, from the viewpoint of transparency. It can be confirmed by no substantial indication of a melting point in a DSC melting curve that the copolymer has substantially no crystallinity.

The copolymer of the present invention is preferably a copolymer substantially having no stereoregularity of the conformation of α-olefins and alkenyl aromatic hydrocarbons in the skeleton of the copolymer, from the viewpoints of transparency, flexibility and elastic recoverability. It can be confirmed by observation of a multiplet of the methylene groups such as Sαβ or the like in the signal of $^{13}$C-NMR spectrum that the copolymer has substantially no stereoregularity of the conformation.

Such copolymer of the present invention can be produced at high polymerization activity, for example, by copolymerizing the α-olefin with the alkenyl aromatic hydrocarbon in the presence of a catalyst comprising (A) and [(B) and/or (C)] described below:

(A): a transition metal complex represented by the following general formula [I]:

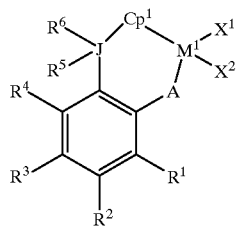

[I]

(wherein $M^1$ represents a transition metal atom of Group IV of the Periodic Table of the Elements; A represents an atom of the Group XVI of the Periodic Table of the Elements; J represents an atom of the Group XIV of the Periodic Table of the Elements; $Cp^1$ represents a group having a cyclopentadiene type anion skeleton; $X^1$, $X^2$, $R^1$, $R^2$, $R^3$, $R^4$, $R^5$ and $R^6$ independently represent a hydrogen atom, a halogen atom, an alkyl group, an aralkyl group, an aryl group, a substituted silyl group, an alkoxy group, an aralkyloxy group, an aryloxy group or a di-substituted amino group; and $R^1$, $R^2$, $R^3$, $R^4$, $R^5$ and $R^6$ may be optionally combined with each other to form a ring);

(B): at least one aluminum compound selected from the following (B1) to (B3);

(B1) an organoaluminum compound represented by the general formula $E^1{}_a AlZ_{3-a}$, (B2) a cyclic aluminoxane having a structure represented by the general formula $\{-Al(E^2)-O-\}_b$, and (B3) a linear aluminoxane having a structure represented by the general formula $E^3\{-Al(E^3)-O-\}_c AlE^3{}_2$ (wherein $E^1$, $E^2$ and $E^3$ respectively represents a hydrocarbon group, all of $E^1$, $E^2$ and $E^3$ may be the same or different; Z represents a hydrogen atom or a halogen atom, and all of Z may be the same or different; a represents a numeral of 0 to 3; b represents an integer of not less than 2; and c represents an integer of not less than 1); and (C): a boron compound of any one of the following (C1) to (C3);

(C1) a boron compound represented by the general formula $BQ^1Q^2Q^3$, (C2) a boron compound represented by the general formula $G^+(BQ^1Q^2Q^3Q^4)^-$, and (C3) a boron compound represented by the general formula $(L-H)^+(BQ^1Q^2Q^3Q^4)^-$ (wherein B represents a boron atom in the trivalent valence state; $Q^1$ to $Q^4$ may be the same or different and represent a halogen atom, a hydrocarbon group, a halogenated hydrocarbon group, a substituted silyl group, an alkoxy group or a di-substituted amino group; $G^+$ represents an inorganic or organic cation; L represents a neutral Lewis base; and $(L-H)^+$ represents a Brønsted acid).

There is explained a process for producing the above-described copolymer below.

(A) Transition Metal Complex

In the general formula [I], the transition metal atom represented by $M^1$ means a transition metal element of Group IV of the Periodic Table of the Elements (IUPAC Inorganic Chemistry Nomenclature, Revised Edition, 1989), and examples thereof include a titanium atom, zirconium atom, hafnium atom, etc. Among them, titanium atom or zirconium atom is preferred.

Examples of an atom of the XVI Group indicated as A in the general formula [I], include an oxygen atom, sulfur atom, selenium atom and the like. Among them, oxygen atom is preferred.

Examples of an atom of the XIV Group indicated as J in the general formula [I], include a carbon atom, silicon atom, germanium atom and the like, a carbon atom and silicon atom are preferred, and a carbon atom is particularly preferred.

The group having a cyclopentadiene anion skeleton, as for the substituent $Cp^1$, includes $\eta^5$-(substituted) cyclopentadienyl group, $\eta^5$-(substituted)indenyl group, $\eta^5$-(substituted)fluorenyl group, etc. Specific examples thereof include $\eta^5$-cyclopentadienyl group, $\eta^5$-methylcyclopentadienyl group, $\eta^5$-dimethylcyclopentadienyl group, $\eta^5$-trimethylcyclopentadienyl group, $\eta^5$-tetramethylcyclopentadienyl group, $\eta^5$-ethylcyclopentadienyl group, $\eta^5$-n-propylcyclopentadienyl group, $\eta^5$-isopropylcyclopentadienyl group, $\eta^5$-n-butylcyclopentadienyl group, $\eta^5$-sec-butylcyclopentadienyl group, $\eta^5$-tert-butylcyclopentadienyl group, $\eta^5$-n-pentylcyclopentadienyl group, $\eta^5$-neopentylcyclopentadienyl group, $\eta^5$-n-hexylcyclopentadienyl group, $\eta^5$-n-octylcyclopentadienyl group, $\eta^5$-phenylcyclopentadienyl group, $\eta^5$-naphthylcyclopentadienyl group, $\eta^5$-trimethylsilylcyclopentadienyl group, $\eta^5$-triethylsilylcyclopentadienyl group, $\eta^5$-tert-butyldimethylsilylcyclopentadienyl group, $\eta^5$-indenyl group, $\eta^5$-methylindenyl group, $\eta^5$-dimethylindenyl group, $\eta^5$-ethylindenyl group, $\eta^5$-n-propylindenyl group, $\eta^5$-isopropylindenyl group, $\eta^5$-n-butylindenyl group, $\eta^5$-sec-butylindenyl group, $\eta^5$-tert-butylindenyl group, $\eta^5$-n-pentylindenyl group, $\eta^5$-neopentylindenyl group, $\eta^5$-n-hexylindenyl group, $\eta^5$-n-octylindenyl group, $\eta^5$-n-decylindenyl group, $\eta^5$-phenylindenyl group, 5-methylphenylindenyl group, $\eta^5$-naphthylindenyl group, $\eta^5$-trimethylsilylindenyl group, $\eta^5$-triethylsilylindenyl group, $\eta^5$-tert-butyldimethylsilylindenyl group, $\eta^5$-tetrahydroindenyl group, $\eta^5$-fluorenyl group, $\eta^5$-methylfluorenyl group, $\eta^5$-dimethylfluorenyl group, $\eta^5$-ethylfluorenyl group, $\eta^5$-diethylfluorenyl group, $\eta^5$-n-propylfluorenyl group, $\eta^5$-di-n-propylf luorenyl group, $\eta^5$-isopropylfluorenyl group, $\eta^5$-diisopropylfluorenyl group, $\eta^5$-n-butylfluorenyl group, $\eta^5$-sec-butylfluorenyl group, $\eta^5$-tert-butylfluorenyl group, $\eta^5$-di-n-butylfluorenyl group, $\eta^5$-di-sec-butylfluorenyl group, $\eta^5$-di-tert-butylfluorenyl group, $\eta^5$-n-pentylfluorenyl group, $\eta^5$-neopentylfluorenyl group, $\eta^5$-n-hexylf luorenyl group, $\eta^5$-n-octylf luorenyl group, $\eta^5$-n-decylfluorenyl group, $\eta^5$-n-dodecylfluorenyl group, $\eta^5$-phenylfluorenyl group, $\eta^5$-diphenylfluorenyl group, $\eta^5$-methylphenylfluorenyl group, $\eta^5$-naphthylfluorenyl group, $\eta^5$-trimethylsilylfluorenyl group, $\eta^5$-bis-trimethylsilylfluorenyl group, $\eta^5$-triethylsilylfluorenyl group, $\eta^5$-tert-butyldimethylsilylfluorenyl group, etc. Among them, an $\eta^5$-cyclopentadienyl group, $\eta^5$-methylcyclopentadienyl group, $\eta^5$-tert-butylcyclopentadienyl group, $\eta^5$-tetramethylcyclopentadienyl group, $\eta^5$-indenyl group and $\eta^5$-fluorenyl group are particularly preferred.

Examples of the halogen atom in the substituent $X^1$, $X^2$, $R^1$, $R^2$, $R^3$, $R^4$, $R^5$ or $R^6$ include fluorine atom, chlorine atom, bromine atom and iodine atom, preferably chlorine atom or bromine atom, more preferably chlorine atom.

As the alkyl group in the substituent $X^1$, $X^2$, $R^1$, $R^2$, $R^3$, $R^4$, $R^5$ or $R^6$, an alkyl group having 1 to 20 carbon atoms is preferred. Examples thereof include methyl group, ethyl group, n-propyl group, isopropyl group, n-butyl group, sec-butyl group, tert-butyl group, n-pentyl group, neopentyl group, sec-amyl group, n-hexyl group, n-octyl group, n-decyl group, n-dodecyl group, n-pentadecyl group, n-eicosyl group, etc., more preferably a methyl group, ethyl group, isopropyl group, tert-butyl group or sec-amyl group.

All of these alkyl groups may be substituted with a halogen atom (fluorine atom, chlorine atom, bromine atom or iodine atom). Examples of the alkyl group having 1 to 20 carbon atoms, which is substituted with the halogen atom, include fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group, etc.

All of these alkyl groups may be partially substituted with an alkoxy group such as methoxy group, ethoxy group, etc., an aryloxy group such as phenoxy group, etc. or an aralkyloxy group such as benzyloxy group, etc.

As the aralkyl group in the substituent $X^1$, $X^2$, $R^1$, $R^2$, $R^3$, $R^4$, $R^5$ or $R^6$, an aralkyl group having 7 to 20 carbon atoms is preferred. Examples thereof include benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (3,5-dimethylphenyl)methyl group, (4,6-dimethylphenyl)methyl group, (2,3,4-timethylphenyl)methyl group, (2,3,5-timethylphenyl)methyl group, (2,3,6-timethylphenyl)methyl group, (3,4,5-timethylphenyl)methyl group, (2,4,6-timethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-dodecylphenyl)methyl group, (n-tetradecylphenyl)methyl group, naphthylmethyl group, anthracenylmethyl group, etc., more preferably a benzyl group.

All of these aralkyl groups may be partially substituted with a halogen atom (fluorine atom, chlorine atom, bromine atom or iodine atom), an alkoxy group such as methoxy group, ethoxy group, etc., an aryloxy group such as phenoxy group, etc. or an aralkyloxy group such as benzyloxy group, etc.

As the aryl group in the substituent $X^1$, $X^2$, $R^1$, $R^2_1$, $R^3$, $R^4$, $R^5$ or $R^6$, an aryl group having 6 to 20 carbon atoms is preferred. Examples thereof include phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group, etc., more preferably phenyl group.

All of these aryl groups may be partially substituted with a halogen atom (fluorine atom, chlorine atom, bromine atom or iodine atom), an alkoxy group such as methoxy group, ethoxy group, etc., an aryloxy group such as phenoxy group, etc. or an aralkyloxy group such as benzyloxy group, etc.

The substituted silyl group in the substituent $X^1$, $X^2$, $R^1$, $R^2$, $R^3$, $R^4$, $R^5$ or $R^6$ is a silyl group substituted with a hydrocarbon group, and examples of the hydrocarbon group include an alkyl group having 1 to 10 carbon atoms, such as methyl group, ethyl group, n-propyl group, isopropyl group, n-butyl group, sec-butyl group, tert-butyl group, isobutyl group, n-pentyl group, n-hexyl group, cyclohexyl group, etc., and an aryl group such as phenyl group. Examples of the substituted silyl group having 1 to 20 carbon atoms include mono-substituted silyl group having 1 to 20 carbon atoms, such as methylsilyl group, ethylsilyl group, phenylsilyl group, etc.; di-substituted silyl group having 2 to 20 carbon atoms, such as dimethylsilyl group, diethylsilyl group, diphenylsilyl group, etc.; and tri-substituted silyl group having 3 to 20 carbon atoms, such as trimethylsilyl group, triethylsilyl group, tri-n-propylsilyl group, triisopropylsilyl group, tri-n-butylsiLlyl group, tri-sec-butylsilyl group, tri-tert-butylsilyl group, tri-isobutylsilyl group, tert-butyl-dimethylsilyl group, tri-n-pentylsilyl group, tri-n-hexylsilyl group, tricyclohexylsilyl group, triphenylsilyl group, etc., preferably trimethylsilyl group, tert-butyldimethylsilyl group or triphenylsilyl group.

All of the hydrocarbon groups of these substituted silyl groups may be partially substituted with a halogen atom (fluorine atom, chlorine atom, bromine atom or iodine atom), an alkoxy group such as methoxy group, ethoxy group, etc., an aryloxy group such as phenoxy group, etc. or an aralkyloxy group such as benzyloxy group, etc.

As the alkoxy group in the substituent $X^1$, $X^2$, $R^1$, $R^2$, $R^3$, $R^4$, $R^5$ or $R^6$, an alkoxy group having 1 to 20 carbon atoms is preferred. Examples thereof include methoxy group, ethoxy group, n-propoxy group, isopropoxy group, n-butoxy group, sec-butoxy group, tert-butoxy group, n-pentoxy group, neopentoxy group, n-hexoxy group, n-octoxy group, n-dodecoxy group, n-pentadecoxy group, n-eicosoxy group, etc., more preferably methoxy group, ethoxy group or tert-butoxy group.

All of these alkoxy groups may be partially substituted with a halogen atom (fluorine atom, chlorine atom, bromine atom or iodine atom), an alkoxy group such as methoxy group, ethoxy group, etc., an aryloxy group such as phenoxy group, etc. or an aralkyloxy group such as benzyloxy group, etc. As the aralkyloxy group in the substituent $X^1$, $X^2$, $R^1$, $R^2$, $R^3$, $R^4$, $R^5$ or $R^6$, an aralkyloxy group having 7 to 20 carbon atoms is preferred. Examples thereof include benzyloxy group, (2-methylphenyl)methoxy group, (3-methylphenyl)methoxy group, (4-methylphenyl)methoxy group, (2,3-dimethylphenyl)methoxy group, (2,4-dimethylphenyl)methoxy group, (2,5-dimethylphenyl) methoxy group, (2,6-dimethylphenyl)methoxy group, (3,4-dimethylphenyl)methoxy group, (3,5-dimethylphenyl) methoxy group, (2,3,4-trimethylphenyl)methoxy group, (2,3,5-trimethylphenyl)methoxy group, (2,3,6-trimethylphenyl)methoxy group, (2,4,5-trimethylphenyl) methoxy group, (2,4,6-trimethylphenyl)methoxy group, (3,4,5-trimethylphenyl)methoxy group, (2,3,4,5-tetramethylphenyl)methoxy group, (2,3,4,6-tetramethylphenyl)methoxy group, (2,3,5,6-tetramethylphenyl)methoxy group, (pentamethylphenyl) methoxy group, (ethylphenyl)methoxy group, (n-propylphenyl)methoxy group, (isopropylphenyl)methoxy group, (n-butylphenyl)methoxy group, (sec-butylphenyl) methoxy group, (tert-butylphenyl)methoxy group, (n-hexylphenyl)methoxy group, (n-octylphenyl)methoxy group, (n-decylphenyl)methoxy group, (n-tetradecylphenyl) methoxy group, naphthylmethoxy group, anthracenyl-methoxy group, etc., more preferably benzyloxy group.

All of these aralkyloxy groups may be partially substituted with a halogen atom (fluorine atom, chlorine atom, bromine atom or iodine atom), an alkoxy group such as methoxy group, ethoxy group, etc., an aryloxy group such as phenoxy group, etc. or an aralkyloxy group such as benzyloxy group, etc.

As the aryloxy group in the substituent $X^1$, $X^2$, $R^1$, $R^2$, $R^3$, $R^4$, $R^5$ or $R^6$, an aralkyloxy group having 6 to 20 carbon atoms is preferred. Examples thereof include phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenoxy group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, anthracenoxy group, etc.

All of these aryloxy groups may be partially substituted with a halogen atom (fluorine atom, chlorine atom, bromine atom or iodine atom), an alkoxy group such as methoxy group, ethoxy group, etc., an aryloxy group such as phenoxy group, etc. or an aralkyloxy group such as benzyloxy group, etc. The di-substituted amino group in the substituent $X^1$, $X^2$, $R^1$, $R^2$, $R^3$, $R^4$, $R^5$ or $R^6$ is an amino group substituted with two hydrocarbon groups, and examples of the hydrocarbon group include alkyl group having 1 to 10 carbon atoms, such as methyl group, ethyl group, n-propyl group, isopropyl group, n-butyl group, sec-butyl group, tert-butyl group, isobutyl group, n-pentyl group, n-hexyl group, cyclohexyl group, etc.; aryl group having 6 to 10 carbon atoms, such as phenyl group, etc.; and aralkyl group having 7 to 10 carbon atoms. Examples of the di-substituted amino group substituted with the hydrocarbon group having 1 to 10 carbon atoms include dimethylamino group, diethylamino group, di-n-propylamino group, diisopropylamino group, di-n-butylamino group, di-sec-butylamino group, di-tert-butylamino group, di-isobutylamino group, tert-butylisopropylamino group, di-n-hexylamino group, di-n-octylamino group, di-n-decylamino group, diphenylamino group, bistrimethylsilylamino group, bis-tert-butyldimethylsilylamino group, etc., preferably dimethylamino group or diethylamino group.

The substituent $R^1$, $R^2$, $R^3$, $R^4$, $R^5$ and $R^6$ may be optionally combined with each other to form a ring.

$R^1$ is preferably an alkyl group, an aralkyl group, an aryl group or a substituted silyl group.

Preferably, each of $X^1$ and $X^2$ is independently a halogen atom, an alkyl group, an aralkyl group, an alkoxy group, an aryloxy group or a di-substituted amino group, more preferably halogen atom.

Examples of the compound (A) represented by the formula [I] (hereinafter referred to as a "transition metal complex A", sometimes) include transition metal complex wherein J is a carbon atom in the general formula [I], such as methylene(cyclopentadienyl)(3,5-dimethyl-2-phenoxy) titanium dichloride, methylene(cyclopentadienyl)(3-tert-butyl-2-phenoxy)titanium dichloride, methylene (cyclopentadienyl)(3-tert-butyl-5-methyl-2-phenoxy) titanium dichloride, methylene(cyclopentadienyl)(3-phenyl-2-phenoxy)titanium dichloride, methylene (cyclopentadienyl)(3-tert-butyldimethylsilyl-5-methyl-2-phenoxy)titanium dichloride, methylene(cyclopentadienyl) (3-trimethylsilyl-5-methyl-2-phenoxy)titanium dichloride, methylene(cyclopentadienyl)(3-tert-butyl-5-methoxy-2-phenoxy)titanium dichloride, methylene(cyclopentadienyl) (3-tert-butyl-5-chloro-2-phenoxy)titanium dichloride, methylene(methylcyclopentadienyl)(3,5-dimethyl-2-phenoxy)titanium dichloride, methylene (methylcyclopentadienyl)(3-tert-butyl-2-phenoxy)titanium dichloride, methylene(methylcyclopentadienyl)(3-tert-butyl-5-methyl-2-phenoxy)titanium dichloride, methylene (methylcyclopentadienyl)(3-phenyl-2-phenoxy)titanium dichloride, methylene(methylcyclopentadienyl)(3-tert-butyldimethylsilyl-5-methyl-2-phenoxy)titanium dichloride, methylene(methylcyclopentadienyl)(3-trimethylsilyl-5-methyl-2-phenoxy)titanium dichloride, methylene(methylcyclopentadienyl)(3-tert-butyl-5-methoxy-2-phenoxy)titanium dichloride, methylene (methylcyclopentadienyl)($^3$-tert-butyl-5-chloro-2-phenoxy) titanium dichloride, methylene(tert-butylcyclopentadienyl) (3,5-dimethyl-2-phenoxy)titanium dichloride, methylene (tert-butylcyclopentadienyl)(3-tert-butyl-2-phenoxy) titanium dichloride, methylene(tert-butylcyclopentadienyl) (3-tert-butyl-5-methyl-2-phenoxy)titanium dichloride, methylene(tert-butylcyclopentadienyl) (3-phenyl-2-phenoxy)titanium dichloride, methylene(tert-butylcyclopentadienyl)(3-tert-butyldimethylsilyl-5-methyl-2-phenoxy)titanium dichloride, methylene(tert-butylcyclopentadienyl)(3-trimethylsilyl-5-methyl-2-phenoxy)titanium dichloride, methylene(tert-butylcyclopentadienyl) (3-tert-butyl-5-methoxy-2-phenoxy) titanium dichloride, methylene(tert-butylcyclopentadienyl) (3-tert-butyl-5-chloro-2-phenoxy)titanium dichloride, methylene(tetramethylcyclopentadieny)(3,5-dimethyl-2-phenoxy)titanium dichloride, methylene (tetramethylcyclopentadienyl)(3-tert-butyl-2-phenoxy) titanium dichloride, methylene (tetramethylcyclopentadienyl)(3-tert-butyl-5-methyl-2-phenoxy)titanium dichloride, methylene (tetramethylcyclopentadienyl)(3-phenyl-2-phenoxy) titanium dichloride, methylene (tetramethylcyclopentadienyl)(3-tert-butyldimethylsilyl-5-methyl-2-phenoxy) titanium dichloride, methylene (tetramethylcyclopentadienyl)(3-trimethylsilyl-5-methyl-2-phenoxy)titanium dichloride, methylene (tetramethylcyclopentadienyl)(3-tert-butyl-5-methoxy-2- phenoxy)titanium dichloride, methylene(tetramethylcyclopentadienyl)(3-tert-butyl-5-chloro-2-phenoxy)titanium dichloride, methylene(trimethylsilylcyclopentadienyl)(3,5-dimethyl-2-phenoxy)titanium dichloride, methylene(trimethylsilylcyclopentadienyl)(3-tert-butyl-2-phenoxy)titanium dichloride, methylene(trimethylsilylcyclopentadienyl)(3-tert-butyl-5-methyl-2-phenoxy)titanium dichloride, methylene(trimethylsilylcyclopentadienyl)(3-phenyl-2-phenoxy)titanium dichloride, methylene(trimethylsilylcyclopentadienyl)(3-tert-butyldimethylsilyl-5-methyl-2-phenoxy)titanium dichloride, methylene(trimethylsilylcyclopentadienyl)(3-trimethylsilyl-5-methyl-2-phenoxy)titanium dichloride, methylene(trimethylsilylcyclopentadienyl)(3-tert-butyl-5-methoxy-2-phenoxy)titanium dichloride, methylene(trimethylsilylcyclopentadienyl)(3-tert-butyl-5-chloro-2-phenoxy)titanium dichloride, methylene(fluorenyl)(3,5-dimethyl-2-phenoxy)titanium dichloride, methylene(fluorenyl)(3-tert-butyl-2-phenoxy)titanium dichloride, methylene(fluorenyl)(3-tert-butyl-5-methyl-2-phenoxy)titanium dichloride, methylene(fluorenyl)(3-phenyl-2-phenoxy)titanium dichloride, methylene(fluorenyl)(3-tert-butyldimethylsilyl-5-methyl-2-phenoxy)titanium dichloride, methylene(fluorenyl)(3-trimethylsilyl-5-methyl-2-phenoxy)titanium dichloride, methylene(fluorenyl)(3-tert-butyl-5-methoxy-2-phenoxy)titanium dichloride, methylene(fluorenyl)(3-tert-butyl-5-chloro-2-phenoxy)titanium dichloride, isopropylidene(cyclopentadienyl)(3,5-dimethyl-2-phenoxy)titanium dichloride, isopropylidene(cyclopentadienyl)(3-tert-butyl-2-phenoxy)titanium dichloride, isopropylidene(cyclopentadienyl)(3-tert-butyl-5-methyl-2-phenoxy)titanium dichloride, isopropylidene(cyclopentadienyl)(3-phenyl-2-phenoxy)titanium dichloride, isopropylidene(cyclopentadienyl)(3-tert-butyldimethylsilyl-5-methyl-2-phenoxy)titanium dichloride, isopropylidene(cyclopentadienyl)(3-trimethylsilyl-5-methyl-2-phenoxy)titanium dichloride, isopropylidene(cyclopentadienyl)(3-tert-butyl-5-methoxy-2-phenoxy)titanium dichloride, isopropylidene(cyclopentadienyl)(3-tert-butyl-5-chloro-2-phenoxy)titanium dichloride, isopropylidene(methylcyclopentadienyl)(3,5-dimethyl-2-phenoxy)titanium dichloride, isopropylidene(methylcyclopentadienyl)(3-tert-butyl-2-phenoxy)titanium dichloride, isopropylidene(methylcyclopentadienyl)(3-tert-butyl-5-methyl-2-phenoxy)titanium dichloride, isopropylidene(methylcyclopentadienyl)(3-phenyl-2-phenoxy)titanium dichloride, isopropylidene(methylcyclopentadienyl)(3-tert-butyldimethylsilyl-5-methyl-2-phenoxy)titanium dichloride, isopropylidene(methylcyclopentadienyl)(3-trimethylsilyl-5-methyl-2-phenoxy)titanium dichloride, isopropylidene(methylcyclopentadienyl)(3-tert-butyl-5-methoxy-2-phenoxy)titanium dichloride, isopropylidene(methylcyclopentadienyl)(3-tert-butyl-5-chloro-2-phenoxy)titanium dichloride, isopropylidene(tert-butylcyclopentadienyl)(3,5-dimethyl-2-phenoxy)titanium dichloride, isopropylidene(tert-butylcyclopentadienyl)(3-tert-butyl-2-phenoxy)titanium dichloride, isopropylidene(tert-butylcyclopentadienyl)(3-tert-butyl-5-methyl-2-phenoxy)titanium dichloride, isopropylidene(tert-butylcyclopentadienyl)(3-phenyl-2-phenoxy)titanium dichloride, isopropylidene(tert-butylcyclopentadienyl)(3-tert-butyldimethylsilyl-5-methyl-2-phenoxy)titanium dichloride, isopropylidene(tert-butylcyclopentadienyl)(3-trimethylsilyl-5-methyl-2-phenoxy)titanium dichloride, isopropylidene(tert-butylcyclopentadienyl)(3-tert-butyl-5-methoxy-2-phenoxy)titanium dichloride, isopropylidene(tert-butylcyclopentadienyl)(3-tert-butyl-5-chloro-2-phenoxy)titanium dichloride, isopropylidene(tetramethylcyclopentadienyl)(3,5-dimethyl-2-phenoxy)titanium dichloride, isopropylidene(tetramethylcyclopentadienyl)(3-tert-butyl-2-phenoxy)titanium dichloride, isopropylidene(tetramethylcyclopentadienyl)(3-tert-butyl- 5-methyl-2-phenoxy)titanium dichloride, isopropylidene(tetramethylcyclopentadienyl)(3-phenyl-2-phenoxy)titanium dichloride, isopropylidene(tetramethylcyclopentadienyl)(3-tert-butyldimethylsilyl-5-methyl-2-phenoxy)titanium dichloride, isopropylidene(tetramethylcyclopentadienyl)(3-trimethylsilyl-5-methyl-2-phenoxy)titanium dichloride, isopropylidene(tetramethylcyclopentadienyl)(3-tert-butyl-5-methoxy-2-phenoxy)titanium dichloride, isopropylidene(tetramethylcyclopentadienyl)(3-tert-butyl-5-chloro-2-phenoxy)titanium dichloride, isopropylidene(trimethylsilylcyclopentadienyl)(3,5-dimethyl-2-phenoxy)titanium dichloride, isopropylidene(trimethylsilylcyclopentadienyl)(3-tert-butyl-2-phenoxy)titanium dichloride, isopropylidene(trimethylsilylcyclopentadienyl)(3-tert-butyl-5-methyl-2-phenoxy)titanium dichloride, isopropylidene(trimethylsilylcyclopentadienyl)(3-phenyl-2-phenoxy)titanium dichloride, isopropylidene(trimethylsilylcyclopentadienyl)(3-tert-butyldimethylsilyl-5-methyl-2-phenoxy)titanium dichloride, isopropylidene(trimethylsilylcyclopentadienyl)(3-trimethylsilyl-5-methyl-2-phenoxy)titanium dichloride, isopropylidene(trimethylsilylcyclopentadienyl)(3-tert-butyl-5-methoxy-2-phenoxy)titanium dichloride, isopropylidene(trimethylsilylcyclopentadienyl)(3-tert-butyl-5-chloro-2-phenoxy)titanium dichloride, isopropylidene(fluorenyl)(3,5-dimethyl-2-phenoxy)titanium dichloride, isopropylidene(fluorenyl)(3-tert-butyl-2-phenoxy)titanium dichloride, isopropylidene(fluorenyl)(3-tert-butyl-5-methyl-2-phenoxy)titanium dichloride, isopropylidene(fluorenyl)(3-phenyl-2-phenoxy)titanium dichloride, isopropylidene(fluorenyl)(3-tert-butyldimethylsilyl-5-methyl-2-phenoxy)titanium dichloride, isopropylidene(fluorenyl)(3-trimethylsilyl-5-methyl-2-phenoxy)titanium dichloride, isopropylidene(fluorenyl)(3-tert-butyl-5-methoxy-2-phenoxy)titanium dichloride, isopropylidene(fluorenyl)(3-tert-butyl-5-chloro-2-phenoxy)titanium dichloride, diphenylmethylene(cyclopentadienyl)(3,5-dimethyl-2-phenoxy)titanium dichloride, diphenylmethylene(cyclopentadienyl)(3-tert-butyl-2-phenoxy)titanium dichloride, diphenylmethylene(cyclopentadienyl)(3-tert-butyl-5-methyl-2-phenoxy)titanium dichloride, diphenylmethylene(cyclopentadienyl)(3-phenyl-2-phenoxy)titanium dichloride, diphenylmethylene(cyclopentadienyl)(3-tert-butyldimethylsilyl-5-methyl-2-phenoxy)titanium dichloride, diphenylmethylene(cyclopentadienyl)(3-trimethylsilyl-5-methyl-2-phenoxy)titanium dichloride, diphenylmethylene(cyclopentadienyl)(3-tert-butyl-5-methoxy-2-phenoxy)titanium dichloride, diphenylmethylene(cyclopentadienyl)(3-tert-butyl-5-chloro-2-phenoxy)titanium dichloride, diphenylmethylene(methylcyclopentadienyl)(3,5-dimethyl-2-phenoxy)titanium dichloride, diphenylmethylene(methylcyclopentadienyl)(3-tert-butyl-2-phenoxy)titanium dichloride, diphenylmethylene(methylcyclopentadienyl)(3-tert-butyl-5-methyl-2-phenoxy)titanium dichloride, diphenylmethylene(methylcyclopentadienyl)(3-phenyl-2-phenoxy)titanium dichloride, diphenylmethylene(methylcyclopentadienyl)(3-tert-butyldimethylsilyl-5-methyl-2-phenoxy)titanium dichloride, diphenylmethylene(methylcyclopentadienyl)(3-trimethylsilyl-5-methyl-2-phenoxy)titanium dichloride, diphenylmethylene(methylcyclopentadienyl)(3-tert-butyl-5-methoxy-2-phenoxy)titanium dichloride, diphenylmethylene(methylcyclopentadienyl)(3-tert-butyl-5-chloro-2-phenoxy)titanium dichloride, diphenylmethylene(tert-butylcyclopentadienyl)(3,5-dimethyl-2-phenoxy)titanium dichloride, diphenylmethylene(tert-butylcyclopentadienyl)(3-tert-butyl-2-phenoxy)titanium dichloride, diphenylmethylene(tert-butylcyclopentadienyl)(3-tert-butyl-5-methyl-2-phenoxy)titanium dichloride, diphenylmethylene(tert-butylcyclopentadienyl)(3-phenyl-2-phenoxy)titanium dichloride, diphenylmethylene(tert-butylcyclopentadienyl) (3-tert-butyldimethylsilyl-5-methyl-2-phenoxy)titanium dichloride, diphenylmethylene(tert-butylcyclopentadienyl)(3-trimethylsilyl-5-methyl-2-phenoxy)titanium dichloride, diphenylmethylene(tert-butylcyclopentadienyl)(3-tert-butyl- 5-methoxy-2-phenoxy)titanium dichloride, diphenylmethylene(tert-butylcyclopentadienyl)(3-tert-butyl-5-chloro-2-phenoxy)titanium dichloride, diphenylmethylene (tetramethylcyclopentadienyl)(3,5-dimethyl-2-phenoxy)titanium dichloride, diphenylmethylene (tetramethylcyclopejntadienyl)(3-tert-butyl-2-phenoxy)titanium dichloride, diphenylmethylene (tetramethylcyclopentadienyl)(3-tert-butyl-5-methyl-2-phenoxy)titanium dichloride, diphenylmethylene (tetramethylcyclopentadienyl)(3-phenyl-2-phenoxy)titanium dichloride, diphenylmethylene (tetramethylcyclopentadienyl)(3-tert-butyldimethylsilyl-5-methyl-2-phenoxy)titanium dichloride, diphenylmethylene (tetramethylcyclopentadienyl)(3-trimethylsilyl-5-methyl-2-phenoxy)titanium dichloride, diphenylmethylene (tetramethylcyclopentadienyl)(3-tert-butyl-5-methoxy-2-phenoxy)titanium di.chloride, diphenylmethylene (tetramethylcyclopentadienyl)(3-tert-butyl-5-chloro-2-phenoxy)titanium dichloride, diphenylmethylene (trimethylsilylcyclopentadienyl)(3,5-dimethyl-2-phenoxy)titanium dichloride, diphenylmethylene (trimethylsilylcyclopentadienyl)(3-tert-butyl-2-phenoxy)titanium dichloride, diphenylmethylene (trimethylsilylcyclopentadienyl)(3-tert-butyl-5-methyl-2-phenoxy)titanium dichloride, diphenylmethylene (trimethylsilylcyclopentadienyl)(3-phenyl-2-phenoxy)titanium dichloride, diphenylmethylene (trimethylsilylcyclopentadienyl)(3-tert-butyldimethylsilyl-5-methyl-2-phenoxy)titanium dichloride, diphenylmethylene(trimethylsilylcyclopentadienyl)(3-trimethylsilyl-5-methyl-2-phenoxy)titanium dichloride, diphenylmethylene(trimethylsilylcyclopentadienyl)(3-tert-butyl-5-methoxy-2-phenoxy)titanium dichloride, diphenylmethylene(trimethylsilylcyclopentadienyl)(3-tert-butyl-5-chloro-2-phenoxy)titanium dichloride, diphenylmethylene(fluorenyl)(3,5-dimethyl-2-phenoxy)titanium dichloride, diphenylmethylene(fluorenyl)(3-tert-butyl-2-phenoxy)titanium dichloride, diphenylmethylene (fluorenyl)(3-tert-butyl-5-methyl-2-phenoxy)titanium dichloride, diphenylmethylene(fluorenyl)(3-phenyl-2-phenoxy)titanium dichloride, diphenylmethylene(fluorenyl) (3-tert-butyldimethylsilyl-5-methyl-2-phenoxy)titanium dichloride, diphenylmethylene(fluorenyl)(3-trimethylsilyl-5-methyl-2-phenoxy)titanium dichloride, diphenylmethylene(fluorenyl)(3-tert-butyl-5-methoxy-2-phenoxy)titanium dichloride, diphenylmethylene(fluorenyl)(3-tert-butyl-5-chloro-2-phenoxy)titanium dichloride, compounds wherein titanium of these compounds is replaced by zirconium or hafnium, compounds wherein dichloride of these compounds is replaced by dibromide, diiodide, bis(dimethylamide), bis(diethylamide), di-n-butoxide or diisopropoxide, compounds wherein (cyclopentadienyl) of these compounds is replaced by (dimethylcyclopentadienyl), (trimethylcyclopentadienyl), (n-butylcyclopentadienyl), (tert-butyldimethylsilylcyclopentadienyl) or (indenyl), and compounds wherein (3,5-dimethyl-2-phenoxy) of these compounds is replaced by (2-phenoxy), (3-methyl-2-phenoxy), (3,5-di-tert-butyl-2-phenoxy), (3-phenyl-5-methyl-2-phenoxy), (3-tert-butyldimethylsilyi-2-phenoxy) or (3-trimethylsilyl-2-phenoxy); and transition metal complex wherein J is an atom of Group XIV of the Periodic Table of the Elements other than carbon atom, such as dimethylsilylene (cyclopentadienyl)(2-phenoxy)titanium dichloride, dimethylsilylene(cyclopentadienyl)(3-methyl-2-phenoxy)titanium dichloride, dimethylsilylene(cyclopentadienyl)(3,5-dimethyl-2-phenoxy)titanium dichloride, dimethylsilylene(cyclopentadienyl)(3-tert-butyl-2-phenoxy)titanium dichloride, dimethylsilylene(cyclopentadienyl)(3-tert-butyl-5-methyl-2-phenoxy)titanium dichloride, dimethylsilylene(cyclopentadienyl)(3,5-di-tert-butyl-2-phenoxy)titanium dichloride, dimethylsilylene (cyclopentadienyl)(5-methyl-3-phenyl-2-phenoxy)titanium dichloride, dimethylsilylene(cyclopentadienyl)(3-tert-butyldimethylsilyl-5-methyl-2-phenoxy)titanium dichloride, dimethylsilylene(cyclopentadienyl)(5-methyl-3-trimethylsilyl-2-phenoxy)titanium dichloride, dimethylsilylene(cyclopentadienyl)(3-tert-butyl-5-methoxy-2-phenoxy)titanium dichloride, dimethylsilylene (cyclopentadienyl)(3-tert-butyl-5-chloro-2-phenoxy)titanium dichloride, dimethylsilylene(cyclopentadienyl)(3,5-di-sec-amyl-2-phenoxy)titanium dichloride, dimethylsilylene(methylcyclopentadienyl)(2-phenoxy)titanium dichloride, dimethylsilylene (methylcyclopentadienyl)(3-methyl-2-phenoxy)titanium dichloride, dimethylsilylene(methylcyclopentadienyl)(3,5-dimethyl-2-phenoxy)titanium dichloride, dimethylsilylene(methylcyclopentadienyl)(3-tert-butyl-2-phenoxy)titanium dichloride, dimethylsilylene(methylcyclopentadienyl)(3-tert-butyl-5-methyl-2-phenoxy)titanium dichloride, dimethylsilylene(methylcyclopentadienyl)(3,5-di-tert-butyl-2-phenoxy)titanium dichloride, dimethylsilylene (methylcyclopentadienyl)(5-methyl-3-phenyl-2-phenoxy)titanium dichloride, dimethylsilylene (methylcyclopentadienyl)(3-tert-butyldimethylsilyl-5-methyl-2-phenoxy)titanium dichloride, dimethylsilylene (methylcyclopentadienyl)(5-methyl-3-trimethylsilyl-2-phenoxy)titanium dichloride, dimethylsilylene (methylcyclopentadienyl)(3-tert-butyl-5-methoxy-2-phenoxy)titanium dichloride, dimethylsilylene (methylcyclopentadienyl)(3-tert-butyl-5-chloro-2-phenoxy)titanium dichloride, dimethylsilylene (methylcyclopentadienyl)(3,5-di-sec-amyl-2-phenoxy)titanium dichloride, dimethylsilylene(n-butylcyclopentadienyl) (2-phenoxy)titanium dichloride, dimethylsilylene(n-butylcyclopentadienyl)(3-methyl-2-phenoxy)titanium dichloride, dimethylsilylene(n-butylcyclopentadienyl)(3,5-dimethyl-2-phenoxy)titanium dichloride, dimethylsilylene(n-butylcyclopentadienyl)(3-tert-butyl-2-phenoxy)titanium dichlc)ride, dimethylsilylene (n-butylcyclopentadienyl)(3-tert-butyl-5-methyl-2-phenoxy)titanium dichloride, dimethylsilylene(n- butylcyclopentadienyl) (3,5-di-tert-butyl-2-phenoxy) titanium dichloride, dimethylsilylene(n-butylcyclopentadienyl) (5-methyl-3-phenyl-2-phenoxy) titanium dichloride, dimethylsilylene(n-butylcyclopentadienyl) (3-tert-butyldimethylsilyl-5-methyl-2-phenoxy)titanium dichloride, dimethylsilylene(n-butylcyclopentadienyl) (5-methyl-3-trimethylsilyl-2-phenoxy)titanium dichloride, dimethylsilylene(n-butylcyclopentadienyl) (3-tert-butyl-5-methoxy-2-phenoxy) titanium dichloride, dimethyl.silylene(n-butylcyclopentadienyl) (3-tert-butyl-5-chloro-2-phenoxy) titanium dichloride, dimethylsilylene(n-butylcyclopentadienyl) (3,5-di-sec-amyl-2-phenoxy) titanium dichloride, dimethylsilylene(tert-butylcyclopentadienyl) (2-phenoxy)titanium dichloride, dimethylsilylene(tert-butylcyclopentadienyl)(3-methyl-2-phenoxy)titanium dichloride, dimethylsilylene(tert-butylcyclopentadienyl) (3,5-dimethyl-2-phenoxy)titanium dichloride, dimethylsilylene(tert-butylcyclopentadienyl) (3-tert-butyl-2-phenoxy)titanium dichloride, dimethylsilylene(tert-butylcyclopentadienyl) (3-tert-butyl-5-methyl-2-phenoxy)titanium dichloride, dimethylsilylene (tert-butylcyclopentadienyl) (3,5-di-tert-butyl-2-phenoxy) titanium dichloride, dimethylsilylene(tert-butylcyclopentadienyl) (5-methyl-3-phenyl-2-phenoxy) titanium dichloride, dimethylsilylene(tert-butylcyclopentadienyl) (3-tert-butyldimethylsilyl-5-methyl-2-phenoxy)titanium dichloride, dimethylsilylene(tert-butylcyclopentadienyl)(5-methyl-3-trimethylsilyl-2-phenoxy)titanium dichloride, dimethylsilylene(tert-butylcyclopentadienyl)(3-tert-butyl-5-methoxy-2-phenoxy) titanium dichloride, dimethylsilylene(tert-butylcyclopentadienyl)(3-tert-butyl-5-chloro-2-phenoxy) titanium dichloride, dimethylsilylene(tert-butylcyclopentadienyl)(3,5-di-sec-amyl-2-phenoxy) titanium dichloride, dimethylsilylene (tetramethylcyclopentadienyl)(2-phenoxy)titanium dichloride, dimethylsilylene(tetramethylcyclopentadienyl) (3-methyl-2-phenoxy)titanium dichloride, dimethylsilylene (tetramethylcyclopentadienyl)(3,5-dimethyl-2-phenoxy) titanium dichloride, dimethylsilylene (tetramethylcyclopentadienyl)(3-tert-butyl-2-phenoxy) titanium dichloride, dimethylsilylene (tetramethylcyclopentadienyl)(3-tert-butyl-5-methyl-2-phenoxy)titanium dichloride, dimethylsilylene (tetramethylcyclopenteadienyl)(3,5-di-tert-butyl-2-phenoxy)titanium dichloride, dimethylsilylene (tetramethylcyclopentadienyl)(5-methyl-3-phenyl-2-phenoxy)titanium dichloride, dimethylsilylene (tetramethylcyclopentadienyl)(3-tert-butyldimethylsilyl-5-methyl-2-phenoxy)titanium dichloride, dimethylsilylene (tetramethylcyclopentadienyl)(5-methyl-3-trimethylsilyl-2-phenoxy)titanium dichloride, dimethylsilylene (tetramethylcyclopentadienyl)(3-tert-butyl-5-methoxy-2-phenoxy)titanium dichloride, dimethylsilylene (tetramethylcyclopentadienyl)(3-tert-butyl-5-chloro-2-phenoxy)titanium dichloride, dimethylsilylene (tetramethylcyclopentadienyl)(3,5-di-sec-amyl-2-phenoxy) titanium dichloride, dimethylsilylene (trimethylsilylcyclopentadienyl)(2-phenoxy)titanium dichloride, dimethylsilylene (trimethylsilylcyclopentadienyl)(3-methyl-2-phenoxy) titanium dichloride, dimethylsilylene (trimethylsilylcyclopentadienyl)(3,5-dimethyl-2-phenoxy) titanium dichloride, dimethylsilylene (trimethylsilylcyclopentadienyl)(3-tert-butyl-2-phenoxy) titanium dichloride, dimethylsilylene (trimethylsilylcyclopentadienyl)(3-tert-butyl-5-methyl-2-phenoxy)titanium dichloride, dimethylsilylene (trimethylsilylcyclopentadienyl)(3,5-di-tert-butyl-2-phenoxy)titanium dichloride, dimethylsilylene (trimethylsilylcyclopentadienyl)(5-methyl-3-phenyl-2-phenoxy)titanium dichloride, dimethylsilylene (trimethylsilylcyclopentadienyl)(3-tert-butyldimethylsilyl-5-methyl-2-phenoxy)titanium dichloride, dimethylsilylene (trimethylsilylcyclopentadienyl)(5-methyl-3-trimethylsilyl-2-phenoxy)titanium dichloride, dimethylsilylene (trimethylsilylcyclopentadienyl)(3-tert-butyl-5-methoxy-2-phenoxy)titanium dichloride, dimethylsilylene (trimethylsilylcyclopentadienyl)(3-tert-butyl-5-chloro-2-phenoxy)titanium dichloride, dimethylsilylene (trimethylsilylcyclopentadienyl)(3,5-di-sec-amyl-2-phenoxy)titanium dichloride, dimethylsilylene(indenyl)(2-phenoxy)titanium dichloride, dimethylsilylene(indenyl)(3-methyl-2-phenoxy)titanium dichloride, dimethylsilylene (indenyl)(3,5-dimethyl-2-phenoxy)titanium dichloride, dimethylsilylene(indenyl)(3-tert-butyl-2-phenoxy)titanium dichloride, dimethylsilylene(indenyl)(3-tert-butyl-5-methyl-2-phenoxy)titanium dichloride, dimethylsilylene(indenyl) (3,5-di-tert-butyl-2-phenoxy)titanium dichloride, dimethylsilylene(indenyl)(5-methyl-3-phenyl-2-phenoxy) titanium dichloride, dimethylsilylene(indenyl)(3-tert-butyldimethylsilyl-5-methyl-2-phenoxy)titanium dichloride, dimethylsilylene(indenyl)(5-methyl-3-trimethylsilyl-2-phenoxy)titanium dichloride, dimethylsilylene(indenyl)(3-tert-butyl-5-methoxy-2-phenoxy)titanium dichloride, dimethylsilylene(indenyl)(3-tert-butyl-5-chloro-2-phenoxy)titanium dichloride, dimethylsilylene(indenyl)(3,5-di-sec-amyl-2-phenoxy) titanium dichloride, dimethylsilylene(fluorenyl) (2-phenoxy)titanium dichloride, dimethylsilylene(fluorenyl) (3-methyl-2-phenoxy)titanium dichoride, dimethylsilylene (fluorenyl)(3,5-dimethyl-2-phenoxy)titanium dichloride, dimethylsilylene(fluorenyl)(3-tert-butyl-2-phenoxy) titanium dichloride, dimethylsilylene(fluorenyl)(3-tert-butyl-5-methyl-2-phenoxy)titanium dichloride, dimethylsilylene(fluorenyl), (3,5-di-tert-butyl-2-phenoxy) titanium dichloride, dimethylsilylene(fluorenyl)(5-ethyl-3-phenyl-2-phenoxy)titanium dichloride, dimethylsilylene (fluorenyl) (3-tert-butyldimethylsilyl-5-methyl-2-phenoxy ) t itanium dichloride, dimethylsilylene(fluorenyl)(5-methyl-3-trimethylsilyl-2-phenoxy)titaniun dichloride, dimethylsilylene(fluorenyl)(3-tert-butyl-5-methoxy-2-phenoxy)titanium dichloride, dimethylsilylene(fluorenyl)(3-tert-butyl-5-chloro-2-phenoxy)titanium dichloride, dipnethylsilylene(fluorenyl)(3,5-di-sec-amyl-2-phenoxy) titanium dichloride, dimethylsilylene (tetramethylcyclopentadienyl)(1-naphthox-2-yl)titanium dichloride, compounds wherein (cyclopentadienyl) of these compounds is replaced by (dimethylcyclopentadienyl), (trimethylcyclopentadienyl), (ethylcyclopentadienyl), (n-propylcyclopentadienyl), (isopropylcyclopentadienyl), (sec-butylcyclopentadienyl), (isobutylcyclopentadienyl), (tert-butyldimethylsilylcyclopentadienyl), (phenylcyclopentadienyl), (methylindenyl) or (phenylindenyl), compounds wherein (2-phenoxy) of these compounds is replaced by (3-phenyl-2-phenoxy), (3-trimethylsilyl-2-phenoxy) or (3-tert-butyldimethylsilyl-2-phenoxy), compounds wherein dimethylsilylene of these compounds is replaced by diethylsilylene, diphenylsilylene or dimethoxysilylene, compounds wherein titanium of these compounds is replaced by zirconium or hafnium, and compound wherein dichloride of these compounds is replaced by dibromide, diiodide, bis(dimethylamide), bis(diethylamide), di-n-butoxide or diisopropoxide.

The transition metal complex represented by the above general formula [I] can be synthesized, for example, by a method disclosed in Japanese Patent Publication No.9-87313.

That is, a compound having a structure that a group having a cyclopentadienyl skeleton and a group having an alkoxybenzene skeleton are combined via an atom of Group XIV is obtained by reacting an alkoxybenzene compound whose ortho-position is halogenated with a cyclopentadiene compound substituted with a halogenated atom of Group XIV in the presence of an organoalkalinemetal or a metallic magnesium. Then, a transition metal complex represented by the above general formula [I] can be synthesized by treating the compound with a base, and reacting with a transition metal halide, a transition metal hydrocarbon compound or transition metal hydrocarbonoxy compound.

(B) Aluminum Compound

The aluminum compound (B) used in the present invention includes publicly known organoaluminum compounds, that is, at least one aluminum compound selected from (B1) to (B3) described below:

(B1) an organoaluminum compound represented by the general formula $E^1_a AlZ_{3-a}$;
(B2) a cyclic aluminoxane having a structure represented by the general formula $\{-Al(E^2)-O-\}_b$; and
(B3) a linear aluminoxane having a structure represented by the general formula $E^3\{-Al(E^3)-O-\}_c AlE^3_2$
(wherein $E^1$, $E^2$ and $E^3$ respectively represent a hydrocarbon group, all of $E^1$, all of $E^2$ and all of $E^3$ may be the same or different; Z represents a hydrogen atom or a halogen atom, and all of Z may be the same or different; a represents a number satisfying the expression $0<a\leq3$; b represents an integer of 2 or more and c represents an integer of 1 or more).

As the hydrocarbon group in $E^1$, $E^2$ or $E^3$, a hydrocarbon group having 1 to 8 carbon atoms is preferred and an alkyl group is more preferred.

Specific examples of the organoaluminum compound (B1) represented by $E^1_a AlZ_{3-a}$ include trialkylaluminums such as trimethylaluminum, triethylaluminum, tri-n-propylaluminum, triisopropylaluminum, triisobutylaluminum, tri-n-hexylaluminum, etc.; dialkylaluminum chlorides such as dimethylaluminum chloride, diethylaluminum chloride, di-n-propylaluminum chloride, diisopropylaluminum chloride, diisobutylaluminum chloride, di-n-hexylaluminum chloride, etc.; alkylaluminum dichlorides such as methylaluminum dichloride, ethylaluminum dichloride, n-propylaluminum dichloride, isopropylaluminum dichloride, isobutylaluminum dichloride, n-hexylaluminum dichloride, etc.; and dialkylaluminum hydrides such as dimethylaluminum hydride, diethylaluminum hydride, di-n-propylaluminum hydride, diisobutylaluminum hydride, di-n-hexylaluminum hydride,etc.

Among them, trialkylaluminum is preferred and triethylaluminum or triisobutylaluminum is more preferred.

Specific examples of $E^2$ and $E^3$ in (B2) a cyic aluminoxane having a structure represented by the general formula $\{-Al(E^2)-O-\}_b$ and (B3) a linear aluminoxane having a structure represented by the general formula $E^3\{-Al(E^3)-O-\}_c AlE^3_2$ include alkyl group such as methyl group, ethyl group, n-propyl group, isopropyl group, n-butyl group, isobutyl group, n-pentyl group, neopentyl group, etc. b is an integer of 2 or more, c is an integer of 1 or more. Each of $E^2$ and $E^3$ is preferably a methyl group or isobutyl group. b is preferably from 2 to 40 and c is preferably from 1 to 40.

The above aluminoxane is prepared by various methods. The method is not specifically limited, and the aluminoxane may be prepared according to a publicly known method. For example, the aluminoxane is prepared by contacting a solution obtained by dissolving a trialkylaluminum (e.g. trimethylaluminum) in a suitable organic solvent (e.g. benzene, aliphatic hydrocarbon) with water. Also, there can be illustrated a method for preparing the aluminoxane by contacting a trialkylaluminum (e.g. trimethylaluminum, etc.) with a metal salt containing crystal water (e.g. copper sulfate hydrate, etc.).

(C) Boron Compound

As the boron compound (C) in the present invention, there can be used any one of (C1) a boron compound represented by the general formula $BQ^1Q^2Q^3$, (C2) a boron compound represented by the general formula $G^+(BQ^1Q^2Q^3Q^4)^-$ and (C3) a boron compound represented by the general formula $(L-H)^+(BQ^1Q^2Q^3Q4)^-$.

In the boron compound (C1) represented by the general formula $BQ^1Q^2Q^3$, B represents a boron atom in the trivalent valence state; $Q^1$ to $Q^3$ may be the same or different and represent a halogen atom, a hydrocarbon group, a halogenated hydrocarbon group, a substituted silyl group, an alkoxy group or a di-substituted amino group. Each of $Q^1$ to $Q^3$ is preferably a halogen atom, a hydrocarbon group having 1 to 20 carbon atoms, a halogenated hydrocarbon group having 1 to 20 carbon atoms, a substituted silyl group having 1 to 20 carbon atoms, an alkoxy group having 1 to 20 carbon atoms or an amino group having 2 to 20 carbon atoms, more preferably a hydrocarbon group having 1 to 20 carbon atoms or a halogenated hydrocarbon group having 1 to 20 carbon atoms. More preferably, $Q^1$ to $Q^4$ are a fluorinated hydrocarbon group having 1 to 20 carbon atoms and containing at least one fluorine atom, and most preferably, $Q^1$ to $Q^4$ are a fluorinated aryl group having 6 to 20 carbon atoms and containing at least one fluorine atom.

Specific examples of the compound (C1) include tris(pentafluorophenyl)borane, tris(2,3,5,6-tetrafluorophenyl)borane, tris(2,3,4,5-tetrafluorophenyl)borane, tris(3,4,5-lrifluorophenyl)borane, tris(2,3,4-trifluorophenyl)borane, phenylbis(pentafluorophenyl)borane, etc., most preferably tris(pentafluorophenyl)borane.

In the boron compound (C2) represented by the general formula $G^+(BQ^1Q^2Q^3Q^4)^-$, $G^+$ represents an inorganic or organic cation; B represents a boron atom in the trivalent valence state; and $Q^1$ to $Q^4$ are the same as defined in $Q^1$ to $Q^3$.

Specific examples of $G^+$ as an inorganic cation in the compound represented by the general formula $G^+(BQ^1Q^2Q^3Q^4)^-$ include a ferrocenium cation, alkyl-substituted ferrocenium cation, silver cation, etc. Examples of the $G^+$ as an organic cation include a triphenylmethyl cation. $G^+$ is preferably a carbenium cation, particularly a triphenylmethyl cation. Examples of $(BQ^1Q^2Q^3Q^4)^-$ include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, phenyltris(pentafluorophenyl)borate, tetrakis(3,5-bistrifluoromethylphenyl)borate, etc.

Specific combination of them include ferroceniumtetrakis(pentafluorophenyl)borate, 1,1'-dimethylferroceniumtetrakis(pentafluorophenyl)borate, silvertetrakis(pentafluorophenyl)borate, triphenylmethyltetrakis(pentafluorophenyl)borate, triphenylmethyltetrakis(3,5-bistrifluoromethylphenyl)borate, etc., most preferably triphenylmethyltetrakis(pentafluorophenyl)borate.

In the boron compound (C3) represented by the formula $(L-H)^+(BQ^1Q^2Q^3Q^4)^-$, L represents a neutral Lewis base;

(L-H)⁺ represents a Brønsted acid; B represents a boron atom in the trivalent valence state; and $Q^1$ to $Q^4$ are the same as defined in $Q^1$ to $Q^3$.

Specific examples of (L-H)⁺ as a Brønsted acid in the compound represented by the formula (L-H)⁺ $(BQ^1Q^2Q^3Q^4)^-$ include trialkyl-substituted ammoniums, N,N-dialkylaniliniums, dialkylammoniums, triarylphosphoniums, etc., and examples of $(BQ^1Q^2Q^3Q^4)^-$ include those as defined above.

Specific combination of them include triethylammoniumtetrakis(pentafluorophenyl)borate, tripropylammoniumtetrakis(pentafluorophenyl)borate, tri(n-butyl)ammoniumtetrakis(pentafluorophenyl)borate, tri(n-butyl)ammoniumtetrakis(3,5-bistrifluoromethylphenyl) borate, N,N-dimethylaniliniumtetrakis(pentafluorophenyl) borate, N,N-diethylaniliniumtetrakis(pentafluorophenyl) borate, N,N-2,4,6-pentamethylaniliniumtetrakis (pentafluorophenyl)borate, N,N-dimethylaniliniumtetrakis (3,5-bistrifluoromethylphenyl)borate, diisopropylammoniumtetrakis (pentafluorophenyl)borate, dicyclohexylammoniumtetrakis (pentafluorophenyl)borate, triphenylphosphoniumtetrakis(pentafluorophenyl)borate, tri (methylphenyl)phosphoniumtetrakis(pentafluorophenyl) bora te, tri(dimethylphenyl)phosphoniumtetrakis (pentafluorophenyl)borate, etc., most preferably tri(n-butyl) ammoniumtetrakis(pentafluorophenyl)borate or N,N-dimethylanilinumtetrakis(pentafluorophenyl)borate.

Polymerization of Olefin

In the present invention, a catalyst for olefin polymerization, comprising a compound (A), and [a compound (B) and/or a compound (C)] is used. In case of using a catalyst for olefin polymerization, comprising two components (A) and (B), the above cyclic aluminoxane (B2) and/or linear aluminoxane (B3) are preferable as (B). Other preferable embodiment of the catalyst for olefin polymerization includes a catalyst for olefin polymerization, comprising the above (A), (B) and (C). As (B), the above (B1) is easily used.

The respective components are desirably used so that a molar ratio of (B)/(A) is usually within the range from 0.1 to 10000, preferably 5 to 2000 and a molar ratio of (C)/(A) is usually within the range from 0.01 to 100, preferably 0.5 to 10.

When the respective components are used in the state of a solution or state suspended in a solvent, the concentration of the respective components is appropriately selected according to the conditions such as ability of an apparatus for feeding the respective components in a polymerization reactor. The respective components are desirably used so that the concentration of (A) is usually from 0.01 to 500 μmol/g, preferably from 0.05 to 100 μmol/g, more preferably from 0.05 to 50 μmol/g; the concentration of (B) is usually from 0.01 to 10000 μmol/g, preferably from 0.1 to 5000 μmol/g, more preferably from 0.1 to 2000 μmol/g, in terms of Al atom; and the concentration of (C) is usually from 0.01 to 500 μmol/g, preferably from 0.05 to 200 μmol/g, more preferably from 0.05 to 100 μmol/g.

As the catalyst used in the present invention, an inorganic carrier such as $SiO_2$, $Al_2O_3$ or the like, and a particle-like carrier including an organic polymer carrier such as a polymer of ethylene, styrene and the like, etc. may be further used in combination.

In the present invention, the polymerization process has no restriction in particular, and any process such as, for example, a batch-wise or continuous gas phase polymerization process, a bulk polymerization process, a solution polymerization process, or a slurry polymerization process or the like can be used. When a solvent is used, various kind of solvents under a condition of not deactivating a catalyst can be used, and example of such solvent includes a hydrocarbon such as benzene, toluene, pentane, hexane, heptane, cyclohexane or the like; and a halogenated hydrocarbon such as methylene dichloride, dichlorostyrene or the like.

The polymerization temperature is not specifically limited, and a range of −100 to 250° C. is usually adopted and a range of −50 to 200° C. is preferably adopted. Further, the polymerization pressure is not specifically limited, but is carried out usually under a pressure of 10 MPa or less and preferably 0.2 MPa/cm² to 5 MPa. Further, achain transfer agent such as hydrogen or the like can be added in order to adjust the molecular weight of the polymer.

Such copolymer of the present invention can be used for a molded article such as a film, a sheet or a receptacle or the like, and is particularly suitable for a film or a sheet.

The film or sheet is obtained, for example, by an inflation molding in which a melted resin is extruded from a circular die and a film inflated in tubular shape is wound up, by a T-die molding in which a melted resin is extruded from a linear T-die and a film or a sheet is wound up, by a calendering or the like.

The molded article of the present invention has properties excellent in scratch resistance, flexibility and elastic recoverability. The scratch resistance can be investigated with a HEIDON tester, and the flexibility and elastic recoverability can be investigated by obtaining a hysteresis curve according to tensile test.

The copolymer of the present invention can be also used in a form of a multi-layer film or sheet of 2 layers or more with other materials. The film or sheet can be produced by a known lamination process such as a co-extrusion process, a dry-lamination process, a sandwich-lamination process, an extrusion-lamination process or the like.

A molded articles obtained by a blow molding and an injection molding are also included in the present invention.

The molded article of the present invention can contain known additives such as antioxidants, weather resistant agents, lublicants, anti-static agents, anti-fogging agents, a pigment and the like, according to requirement. Further, known polymer materials such as a low density polyethylene obtained by a radical polymerization process, a high density polyethylene, a linear low density polyethylene, an ethylene-α-olefin copolymer elastomer, a polypropylene and the like may be blended.

The film or sheet of the present invention can be subjected to a known post-treatment with a corona discharge treatment, a plasma treatment, an ozone treatment, an ultraviolet rays irradiation, an electron beam irradiation or the like.

EXAMPLE

The present invention is further illustrated in detail according to Examples and Comparative Examples below, but the scope of the present invention is not limited thereto. Further, properties of the polymers in Examples were measured according to methods described below.

(1) Glass transition point was measured under conditions below with a differential scanning caloriemeter(DSC) (SSC-5200 manufacture by Seiko Electronics Co., Ltd.) and determined by its inflection point.

Heating: 20° C. to 200° C. (20° C./min.), retention for 10 min.

Cooling: 200° C. to −50° C. (20° C./min.), retention for 10 min.

Measurement: −50° C. to 300° C. (20° C./min.)

(2) Molecular weight and molecular weight distribution were determined under conditions below with Gel Permeation Chromatograph (800 series manufacture by Nippon Bunko Co., Ltd.).

Column: Shodex A806M

Measurement temperature: 45° C.,

Measurement solvent: Tetrahydrofuran

Measurement concentration: 0.5 mg/ml (3) The content of styrene units in a polymer and the structure of the polymer were determined according to $^{13}$C-NMR analysis (JNM-EX270 manufactured by JEOL LTD.).

Measurement solvent: Ortho-dichlorobenzene

Measurement temperature: 135° C.

(4) The solid viscoelasticity of a polymer was determined with a spectrometer (DMS200 of SDM5600 manufactured by Seiko Electronics Co., Ltd.) under conditions below.

Test piece: Press sheet of 20 mm×3.0 mm×0.3 mm

Frequency: 5 Hz

Speed of heating: 2° C./min.

Displacement of amplitude: 10 μm (5) The hysteresis curve of a polymer was determined under conditions below with STROGRAPH-T (manufactured by Toyo Seiki Seisakusho Co., Ltd.).

Test piece: Press sheet of 120 mm×20 mm×0.3 mm

Tensile rate: 200 mm/min.

Tensile magnification: Double

Distance between chucks: 60 mm (6) The refractive index of a polymer was determined by measuring a test piece which was obtained by cutting into a size of 10 mm×30 mm a film of 100 μm thickness molded by carrying out hot-press at 180° C. for 3 minutes under a pressure of 3 to 5 MPa after previously heating at 180° C. for 3 minutes, with an Abbe refractometer type 3 (manufactured by Atago Co., Ltd.).

Example 1

After previously charging 55 ml of styrene and 19 ml of dry toluene into a 400 ml autoclave which had been replaced with argon, propylene was charged at a pressure of 0.8 MPa. After 4.0 ml (4 mmol) of toluene solution of triisobutylaluminum [manufactured by Toso-Akzo Co., Ltd., 1 mol/l] and a solution obtained by dissolving 6.0 mg (16 μmol) of isopropylidene(cyclopentadienyl)(3-tert-butyl-5-methyl-2-phenoxy)titanium dichloride in 8 ml of dry toluene, were previously mixed, they were charged therein and successively, a solution obtained by dissolving 44.3 mg (48 μmol) of triphenylmethyltetrakis(pentafluorophenyl)borate in 9.6 ml of dry toluene was added. The reaction solution was stirred at 60° C. for 1 hour. Then, the reaction solution was poured in a mixture of 5 ml of hydrogen chloride (12N) and 1000 ml of methanol, and a white solid precipitated was separated by filtration. Said solid was rinsed with methanol and then dried under reduced pressure to obtain 4.08 g of a polymer. The catalyst activity based on 1 mole of the titanium compound was 255 kg/mol-Ti. The number average molecular weight of the polymer was 75,000, molecular weight distribution [weight average molecular weight(Mw)/number average molecular weight(Mn)] was 1.70, glass transition point was 35° C., and melting point could not be confirmed.

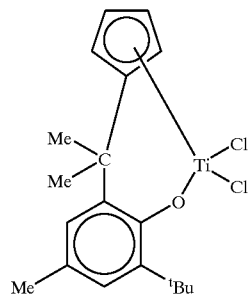

Figure 2:
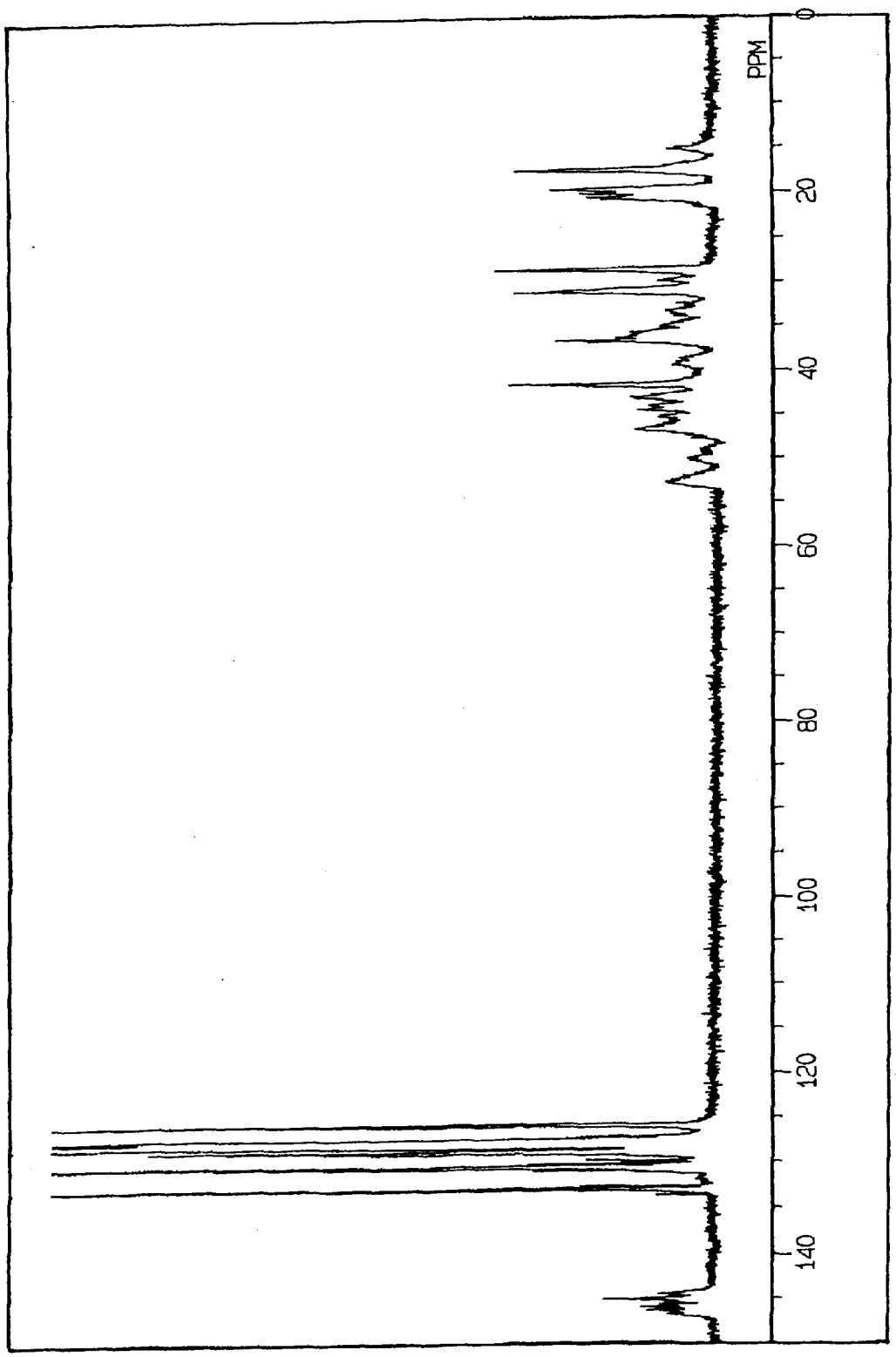
FIG. 2 is a $^{13}$C-NMR spectrum of the copolymer obtained in Example 1.

The $^{13}$C-NMR spectrum is shown in FIG. 2. Signals corresponding to the methylene groups (Sαβ) when tertiary carbon atoms are mutually separated by two methylene groups was observed at 30 to 38 ppm. Each of the Sαβ in a bond of mutual styrene units, the Sαβ in a bond of mutual propylene units and the Sαβ in a bond of styrene unit and propylene unit was observed as a multiplet at 30 to 38 ppm.

Figure 3:
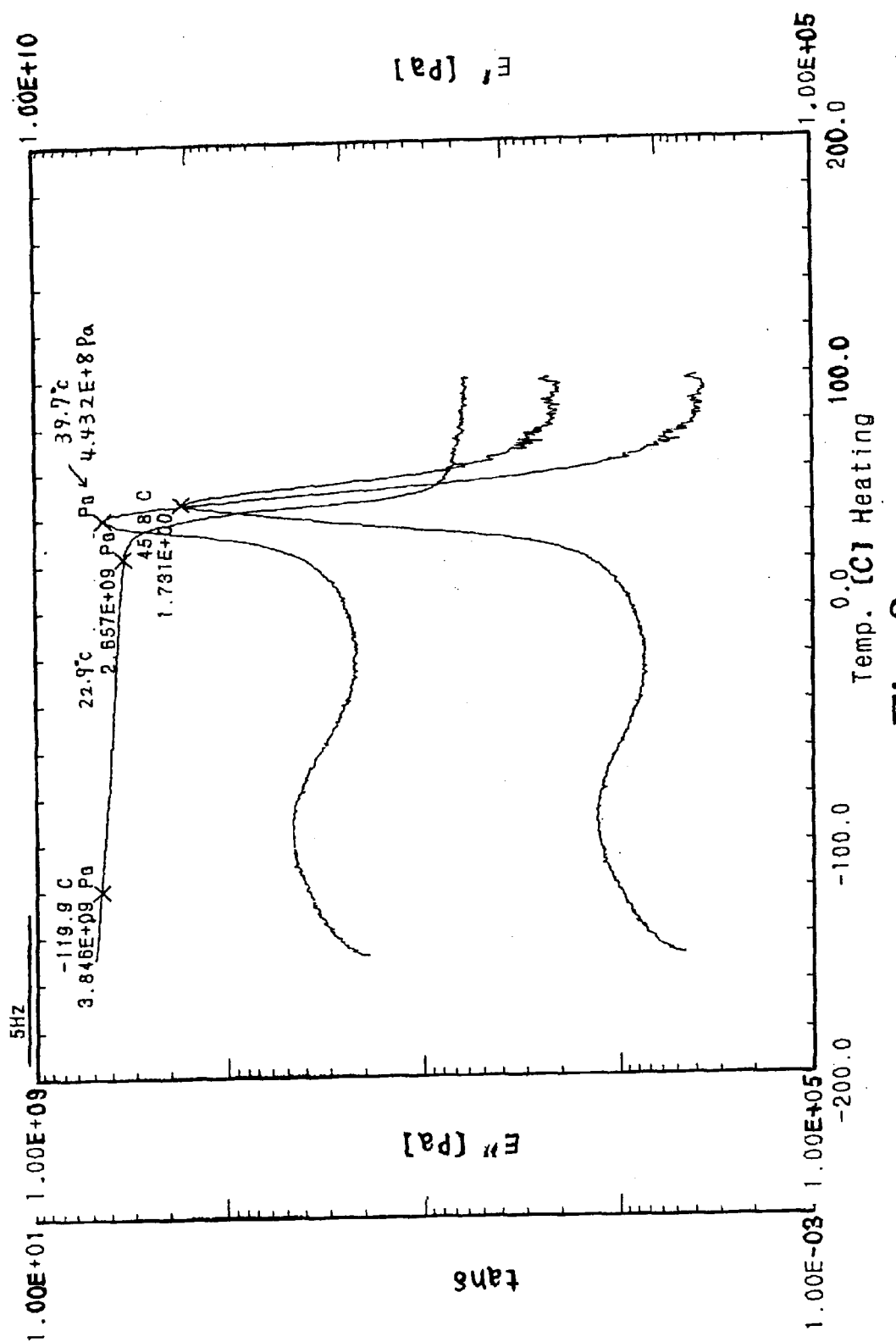
FIG. 3 is a data of the solid viscoelasticity of the copolymer obtained in Example 1.
Figure 4:
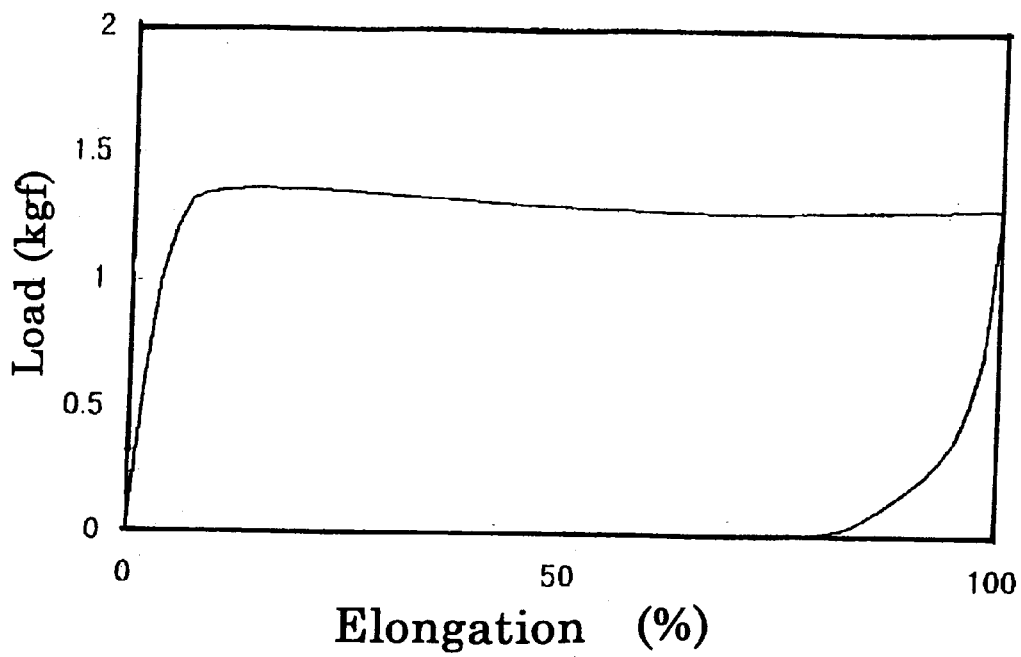
FIG. 4 is a hysteresis curve of the copolymer obtained in Example 1.

The content of styrene unit was 17% by mole. The measurement result of spectrometer is shown in FIG. 3 and a hysteresis curve measured at 40° C. is shown in FIG. 4. The press sheet used for the measurement was transparent.

Example 2

Figure 5:
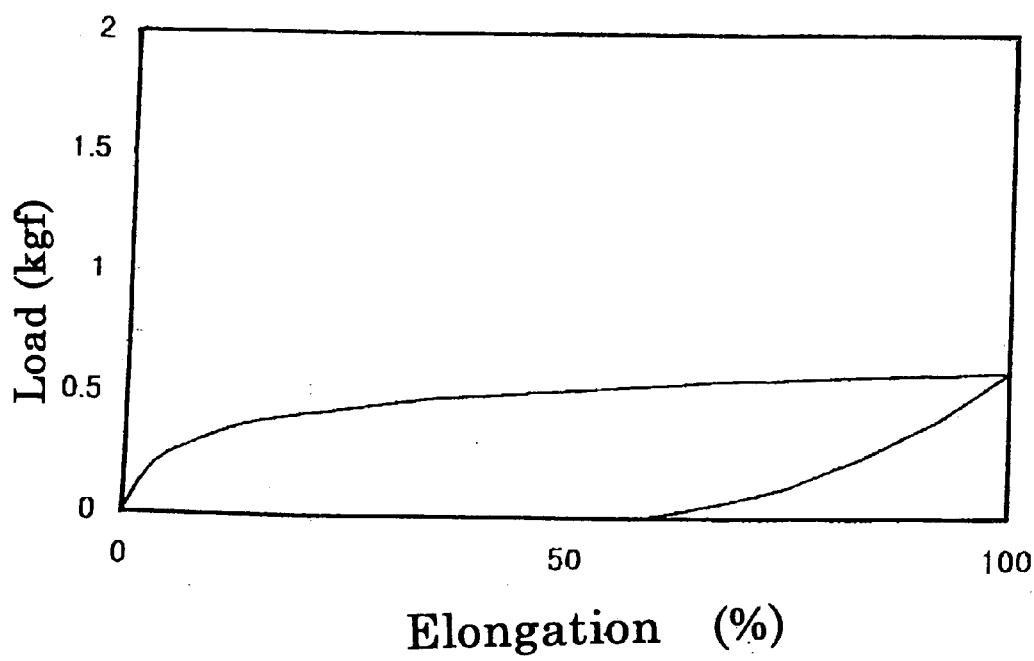
FIG. 5 is a hysteresis curve of the copolymer obtained in Example 2.

The same operation as in Example I was carried out to obtain 3.34 g of a polymer, except that the amount of styrene in Example 1 was changed from 55 ml to 27 ml and the amount of dry toluene was changed from 19 ml to 68 ml. The catalyst activity per 1 mole of the titanium compound was 209kg-polymer/mol-Ti. The number average molecular weight of the polymer was 52,000, molecular weight distribution (Mw/Mn) was 1.72, glass transition point was 14° C., and melting point was not substantially confirmed. The signals correspond to the methylene groups (Sαβ), when tertiary carbon atoms are mutually separated by two methylene groups, were observed at 30 to 38 ppm in a $^{13}$C-NMR spectrum . The content of styrene unit was 6% by mole. The hysteresis curve measured at 23° C. is shown in FIG. 5. The press sheet used for the measurement was transparent. The refractive index of the film of the polymer obtained was 1.526.

Example 3

The same operation as in Example 1 was carried out to obtain 3.78 g of apolymer, except that the amount of styrene in Example 1 was changed from 55 ml to 14 ml and 19 ml of dry toluene was changed to 82 ml of dry toluene. The catalyst activity per 1 mole of the titanium compound was 236 kg-polymer/mol-Ti. The number average molecular weight of the polymer was 39,000, molecular weight distribution (Mw/Mn) was 1.71, glass transition point was 2° C., and melting point was not substantially confirmed. The signals correspond to the methylene groups (Sαβ), when tertiary carbon atoms are mutually separated by two methylene groups, were observed at 30 to 38 ppm in a $^{13}$C-NMR spectrum.

Example 4

Among a polymer obtained by carrying out the same operation as in Example 1 except that the pressure of propylene in Example 1 was changed from 0.8 MPa to 0.4 MPa, a component insoluble in acetone was separated with a Soxhlet extractor to obtain 1.50 g of a polymer. The catalyst activity per 1 mole of the titanium compound was 94 kg-polymer/mol-Ti. The number average molecular weight of the polymer was 13,000, molecular weight distribution (Mw/Mn) was 1.67, glass transition point was 49° C., and melting point was not substantially confirmed. The signals correspond to the methylene groups (Sαβ), when tertiary carbon atoms are mutually separated by two methylene groups, were observed at 30 to 38 ppm in a $^{13}$C-NMR spectrum.

As illustrated in detail above, according to the present invention, a novel copolymer of an α-olefin with an alkenyl aromatic hydrocarbon capable of taking a constitution in which halogen pointed out as a cause for environmental pollution is not contained, a process for producing said copolymer at high polymerization activity and a molded article being transparent and excellent in elastic recoverability and flexibility which comprises said copolymer, are provided, and its industrial value is markedly great.

What is claimed is:

1. A copolymer of an α-olefin with an alkenyl aromatic hydrocarbon, having a structure at which tertiary carbon atoms are mutually separated by two methylene groups in the backbone of the copolymer.

2. The copolymer according to claim 1, wherein the molecular weight distribution (Mw/Mn) represented by a ratio of weight average molecular weight to number average molecular weight is 1.5 to 4.0.

3. The copolymer according to claim 1, wherein the copolymer substantially has no crystallinity.

4. The copolymer according to claim 2, wherein the copolymer substantially has no crystallinity.

5. The copolymer according to claim 1, wherein the copolymer substantially has no stereoregularity of the configurations of an α-olefin and an alkenyl aromatic hydrocarbon in the backbone of the copolymer.

6. The copolymer according to claim 2, wherein the copolymer substantially has no stereoregularity of the configurations of an α-olefin and an alkenyl aromatic hydrocarbon in the backbone of the copolymer.

7. The copolymer according to claim 3, wherein the copolymer substantially has no stereoregularity of the configurations of an α-olefin and an alkenyl aromatic hydrocarbon in the backbone of the copolymer.

8. The copolymer according to claim 4, wherein the copolymer substantially has no stereoregularity of the configurations of an α-olefin and an alkenyl aromatic hydrocarbon in the backbone of the copolymer.

9. The copolymer according to claim 5, wherein the copolymer substantially has no stereoregularity of the configurations of an α-olefin and an alkenyl aromatic hydrocarbon in the backbone of the copolymer.

10. A method for producing a copolymer of an α-olefin with an alkenyl aromatic hydrocarbon having a structure at which tertiary carbon atoms are mutually separated by two methylene groups in the skeleton of the copolymer, which comprises copolymerizing an α-olefin and an alkenyl aromatic hydrocarbon with a catalyst for olefin polymerization, prepared by a process comprising contacting the following (A), (B) and (C); (A) and (B); or (A) and (C):

(A) a transition metal complex represented by the following general formula [I]:

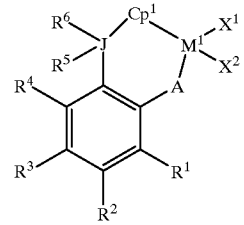

wherein $M^1$ represents a transition metal atom of Group IV of the Periodic Table of the Elements; A represents an atom of Group XVI of the Periodic Table of the Elements; J represents an atom of Group XIV of the Periodic Table of the Elements; $Cp^1$ represents a group having a cyclopentadiene anion skeleton; $X^1$, $X^2$, $R^1$, $R^2$, $R^3$, $R^4$, $R^5$ and $R^6$ independently represent a hydrogen atom, a halogen atom, an alkyl group, an aralkyl group, an aryl group, a substituted silyl group, an alkoxy group, an aralkyloxy group, an aryloxy group or a di-substituted amino group; and $R^1$, $R^2$, $R^3$, $R^4$, $R^5$ and $R^6$ may be optionally combined with each other to form a ring;

(B) at least one aluminum compound selected from the following (B1) to (B3):

(B1) an organoaluminum compound represented by the general formula $E^1{}_a AlZ_{3-a}$, (B2) a cyclic aluminoxane having a structure represented by the general formula $\{-Al(E^2)-O-\}_b$, and (B3) a linear aluminoxane having a structure represented by the general formula $E^3\{-Al(E^3)-O-\}_c AlE^3{}_2$, wherein $E^1$, $E^2$ and $E^3$ each respectively represents a hydrocarbon group, all of $E^1$, $E^2$ and $E^3$ may be the same or different, Z represents a hydrogen atom or a halogen atom, and all of Z may be the same or different, a represents a numeral of 0 to 3, b represents an integer of not less than 2, and c represents an integer of not less than 1; and (C) a boron compound of any one of the following (C1) to (C3):

(C1) a boron compound represented by the general formula $BQ^1Q^2Q^3$, (C2) a boron compound represented by the general formula $G^+(BQ^1Q^2Q^3Q^4)^-$, and (C3) a boron compound represented by the general formula $(L-H)^+(BQ^1Q^2Q^3Q^4)^-$, wherein B represents a boron atom in the trivalent valence state, $Q^1$ to $Q^4$ may be the same or different and represent a halogen atom, a hydrocarbon group, a halogenated hydrocarbon group, a substituted silyl group, an alkoxy group or a di-substituted amino group, $G^+$ represents an inorganic or organic cation, L represents a neutral Lewis base, and $(L-H)^+$ represents a Brønsted acid.

11. A molded article comprising the copolymer of claim 1.

12. A molded article comprising the copolymer of claim 2.

13. A molded article comprising the copolymer of claim 3.

14. A molded article comprising the copolymer of claim 4.

15. A molded article comprising the copolymer of claim 5.

16. The molded article according to claim 11, wherein the molded article is a film or a sheet.

17. The molded article according to claim 12, wherein the molded article is a film or a sheet.

18. The molded article according to claim 13, wherein the molded article is a film or a sheet.

19. The molded article according to claim 14, wherein the molded article is a film or a sheet.

20. The molded article according to claim 15, wherein the molded article is a film or a sheet.

* * * * *